United States Patent [19]
VanKleeck

[11] Patent Number: 5,094,824
[45] Date of Patent: Mar. 10, 1992

[54] H₂S REMOVAL PROCESS

[75] Inventor: David A. VanKleeck, Sugarland, Tex.

[73] Assignee: Shell Oil Company, Houston, Tex.

[21] Appl. No.: 620,981

[22] Filed: Nov. 30, 1990

[51] Int. Cl.⁵ .................. C01B 17/16; C01B 31/02; C01B 17/02
[52] U.S. Cl. .................................... 423/224; 423/226; 423/573.1; 423/576.5; 423/576.6
[58] Field of Search ............... 423/576.6, 576.5, 573.1, 423/226, 224

[56] References Cited
U.S. PATENT DOCUMENTS

| 4,414,817 | 11/1989 | Jermigan | 423/576.6 |
| 4,876,075 | 10/1989 | Van Kleech | 423/576.6 |
| 4,919,914 | 4/1990 | Smith et al. | 43/576.6 |
| 4,975,255 | 12/1990 | Bowman | 423/576.6 |

Primary Examiner—Gregory A. Heller

[57] ABSTRACT

A process for removal of H₂S from sour gaseous streams by use of an aqueous reactant solution is described in which the sour gaseous stream is employed as the motive force to transport the solution during the contact phase of the process, at the same time the static head of the aqueous reactant solution in the reservoir is used to provide the solution in the reservoir to the reaction zone entrance.

10 Claims, 1 Drawing Sheet

$H_2S$ REMOVAL PROCESS

BACKGROUND OF THE INVENTION

The presence of significant quantities of $H_2S$ in various "sour" industrial gaseous streams poses a persistent problem. Although various procedures have been developed to remove and recover this contaminant, most such processes are deficient, for a variety of reasons.

While sour gaseous streams that contain relatively low concentrations of $H_2S$ may be treated successfully in a variety of ways if deep removal, e.g., greater than 95 percent removal of $H_2S$, is not required, removal of this level, or greater, demands efficiencies of operation if excessive costs of operations and materials are not to be incurred.

One scheme for carrying out the gas treatment utilizes a two-stage contacting procedure in which a venturi-shaped contacting zone is utilized as an initial or primary contacting stage to remove the bulk of the $H_2S$, and follow-up or "clean-up" stage, such as a packed column or sparged tower, is provided for removing the remainder of the $H_2S$ in the gaseous stream. This configuration has a number of drawbacks, such as susceptibility of plugging, high gas pressure drop, and high cost. Again, U.S. Pat. No. 4,238,462 describes a process for reacting in circulating reaction solution with different gases in a single reaction vessel, the movement of the solution being accomplished by contrived density differential in the different reaction zones of the vessel. While this process has the advantage of "free" liquid circulation, it appears limited to treatment of gases where the regenerating oxygen does not pose a hazard, and thus appears unsuited, e.g., to treatement of hydrocarbons such as methane or ethane.

Accordingly, a process which provided an efficient and economic contacting technique to insure good absorption and reaction rates of the $H_2S$ into and with the contacting solution, while avoiding or minimizing the deficiencies mentioned, might have great utility. The invention is directed to such a process.

SUMMARY OF THE INVENTION

Accordingly, the invention relates to a process for the removal of hydrogen sulfide from a sour gaseous stream comprising feeding the sour gaseous stream to a vertically disposed confined or walled reaction zone containing an aqueous reactant solution, at a temperature below the melting point of sulfur;

passing said gasous stream and aqueous reactant solution cocurrently upward through the reaction zone, the momentum of the gaseous stream being sufficient to provide and providing the principal motive force for the upward movement of the aqueous reactant solution, under conditions and for a time sufficient to remove hydrogen sulfide from said gaseous stream, and producing a purified gas, sulfur, and partially spent solution admixture;

passing the purified gas, sulfur, and partially spent solution admixture to a gas-liquid separation zone comprising an open separation space and a liquid reservoir in liquid flow communication with the entrance of said reaction zone;

separating the purified gas, sulfur, and partially spent solution admixture in said separation zone into a purified gas stream and partially spent solution containing sulfur; and collecting and combining partially spent solution containing sulfur with and forming a part of the aqueous reactant solution in said reservoir;

removing aqueous reactant solution from the reservoir, and regenerating at least a portion thereof to produce a regenerated reactant solution, and returning regenerated reactant solution to the liquid reservoir and combining the regenerated reactant solution with the aqueous reactant solution;

periodically or continuously recovering sulfur from aqueous reactant solution or regenerated reactant solution;

concurrently maintaining the aqueous reactant solution liquid level in said reservor at a level sufficient to provide aqueous reactant solution by gravity to the entrance of said reaction zone.

As will be apparent to those skilled in the art from the further disclosure herein, the invention relies on the motive force of the gas feed to transport the solution during the contact phase of the process, concurrently utilizing the static head of the aqueous reactant solution in the reservoir to provide the solution in the reservoir to the reaction zone entrance.

As used herein, the term "aqueous reactant solution" refers broadly to an aqueous solution containing a suitable regenerable ionic or chelated oxidizing agent for hydrogen sulfide, and, more particularly, to such solution present in the gas-liquid separation zone reservoir, such solution including (during operation of the process) a mixture of collected partially spent solution, regenerated reactant solution, and sulfur. The aqueous reactant solution may also be modified by addition of make-up composition and bleed to remove the water formed by the reaction. The oxidizing agent, in converting the hydrogen sulfide to sulfur, is itself converted to a reduced state which must be oxidized for reuse. As those skilled in the art will recognize, the aqueous reactant solution of the invention will contain both the oxidized form and the reduced form of the agent, as discussed more fully hereinafter.

Preferred oxidation agents are polyvalent metals, supplied in solution as polyvalent ions or as chelated ions, or as mixtures thereof. Any polyvalent metal may be used, but iron, copper, and manganese are preferred, particularly iron. As indicated, the polyvalent metal should be capable of oxidizing hydrogen sulfide, while being reduced itself from a higher to a lower valence state, and should then be oxidizable to the higher valence state in a typical redox reaction. Other polyvalent metals which may be used include lead, mercury, palladium, platinum, tungsten, nickel, chromium, cobalt, vanadium, titanium, tantalum, zirconium, molybdenum, and tin.

Preferred reactant materials are coordination complexes in which polyvalent metals form chelates with an acid having the formula

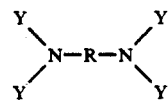

wherein
from two to four of the groups Y are selected from acetic and propionic acid groups;
from zero to two of the groups Y are selected from 2-hydroxyethyl, 2-hydroxypropyl, and

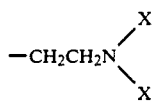

wherein X is selected from acetic and propionic acid groups; and R is ethylene, proplene or isopropylene or alternatively cyclohexane or benzene where the two hydrogen atoms replaced by nitrogen are in the 1,2 position, or with nitrilotriacetic acid, and mixtures thereof.

The metal chelates are supplied in solution as solubilized species, such as the ammonium or alkali metal salts (or mixtures thereof) of the metal chelates. As used herein, the term "solubilized" refers to the dissolved metal chelate or chelates, whether as a salt or salts of the aforementioned cation or cations, or in some other form, in which the metal chelate or chelates exist in solution. Where solubility of the chelate is difficult, and higher concentrations of chelates are desired, the ammonium salt may be utilized, as described in U.S. Pat. No. 4,859,446, entitled "Process for the Removal of $H_2S$ from Sour Gaseous Streams." However, the invention may also be employed with more dilute solutions of the chelates, wherein the steps taken to prevent chelate precipitation are not critical. Exemplary chelating agents for the metals, particularly for iron, include aminoacetic acids derived from ethylenediamine, diethylenetriamine, 1,2-propylenediamine, and 1,3-propylenediamine, such as EDTA (ethylenediamine tetraacetic acid), HEEDTA (N-2-hydroxyethyl ethylenediamine triacetic acid), DETPA (diethylenetriamine pentaacetic acid); amino acetic acid derivatives of cyclic, 1,2 -diamines, such as 1,2-diamino cyclohexane-N,N-tetraacetic acid, and 1,2-phenylene-diamine-N,N-tetraacetic acid, and the amides of polyamino acetic acids disclosed in Bersworth U.S. Pat. No. 3,580,950. The ferric chelates of nitrilotriacetic acid and N-(2-hydroxyethyl) ethylenediamine triacetic acid are preferred.

It is a preferred aspect of the invention that, by suitable flow rates and design of the reaction zone, the flow of the gas-solution mixture through the reaction zone will reach or approximate plug flow. The reaction zone may also incorporate structure for providing improved mixing. Suitable structures for providing the improved mixing include, but are not limited to, chevron-type mixers, such as Koch static mixers of Glitsch Gempak mixers.

The velocity of the gas treated may vary widely. Suitable gas velocities may range from about 0.1 foot per second to about 50 feet per second, with a range of from about 1.0 foot per second to about 30 feet per second being preferred. As noted, the aqueous reactant solution to gas ratio must be sufficient to provide effective removal of $H_2S$ while inhibiting or preventing sulfur deposition in the reaction zones. Preferably, the solution to gas ratio will range from 0.2:100 to 30:100, most preferably from 0.5:100 to 5:100, all by volume. Such ratios will also generally be sufficient to provide good wetting of any channel surfaces so that sulfur deposition is inhibited or prevented.

The metals and the metal chelates employed are regenerable species in which the regeneration is preferably accomplished by the utilization of oxygen, preferably as air. As used herein, the term "oxygen" is not limited to "pure" oxygen, but includes air, air enriched with oxygen, or other oxygen-containing gases. The oxygen will accomplish two functions, the oxidation of the polyvalent metal ion of the reactant to its higher valence state, and the stripping of any residual dissolved gas (if originally present) from the aqueous admixture. The oxygen (in whatever form supplied) is supplied in a stoichiometric equivalent or excess with respect to the amount of solubilized chelate to be oxidized to the higher valence state. Preferably, the oxygen is supplied in an amount to from about 20 percent to about 500 percent excess. Electrochemical regeneration may also be employed.

DETAILED DESCRIPTION OF THE INVENTION

The particular type of sour gaseous stream treated is not critical, the only practical limitation being the reactivity of the stream itself with the solutions employed, as will be evident to those skilled in the art. Streams particularly suited to removal of $H_2S$ by the practice of the invention are, as indicated naturally-occurring gases, recycled $CO_2$ used in enhanced oil recovery, synthesis gases, process gases, and fuel gases produced by gasification procedures, e.g., gases produced by the gasification of coal, petroleum, shale, tar sands, etc. Particularly preferred are coal gasification streams, natural gas streams, produced and recycled $CO_2$ streams, and refinery feedstocks composed of gaseous hydrocarbon streams, especially those streams of this type having a low ratio of $H_2S$ to $CO_2$, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as a hydrocarbon. Again, streams containing principally a single hydrocarbon, e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.005 percent to about 10 percent by volume. $CO_2$ may or may not be present, but if present, may range in content from about 0.1 percent to about 99.0 percent (or more) by volume. In this context, the invention may be used to remove $H_2S$ from various $CO_2$ streams, e.g., supercritical $CO_2$ streams. Obviously, the amounts of $H_2S$ and $CO_2$ present are not generally a limiting factor in the practice of the invention. The stream treated may also have been treated initially for $H_2S$ removal, by this or some other technique.

The temperatures employed in the reaction zone are not generally critical, except that the reaction is carried out below the melting point of sulfur. In many commercial applications, such as removal of $H_2S$ from natural gas to meet pipeline specifications, absorption at ambient temperatures is desired. In general, temperatures of from 10° C. to 80° C. are suitable, and temperatures of from 20° C. to 60° C. are preferred. Total contact times may be varied widely, but will preferably range from about 0.5 second to about 10 seconds, with total contact times of about 1 second to about 5 seconds being most preferred.

Similarly, in the regeneration zone or zones, temperatures may be varied widely. Preferably, the regeneration zone should be maintained at somewhat lower temperatures compared to the contacting or reaction zone. In general, temperatures of from about 10° C. to 80° C., preferably 20° C. to 50° C., may be employed.

Pressure conditions in the contacting zone may vary widely, depending on the pressure of the gas to be treated. For example, pressures in the contacting zone may vary from one atmosphere up to one hundred fifty or even two hundred atmospheres. Pressures of from one atmosphere to about one hundred atmospheres are preferred. In the regeneration zone, pressures may be varied considerably, and will preferably range from about one atmosphere to about three or four atmospheres. Residence times for given volumes of admixture and oxygen will also vary, but preferably will range from about 1 minute to about 60 minutes, most preferably from about 1 minute to about 40 minutes. Other conditions of operation for this type of reaction process are further described in U.S. Pat. No. 3,068,065 to Hartley et al, dated Dec. 11, 1962, incorporated herein by reference, and in the aforementioned patent. Preferably, pH in the regeneration zone will range from about 6.5 to about 8.5, and the molar ratio of the free acid, in the case of chelated metals, to total solubilized metal ia from about 1.0 to 1.5. The process is preferably conducted continuously.

As indicated, the $H_2S$, when contacted, is rapidly converted in the process of the invention by the oxidizing agent to solid elemental sulfur. The amount of solubilized oxidizing agent supplied or employed in solution is an amount sufficient to reduce the $H_2S$ concentration or content of the stream to the desired level. If total or substantially total removal is desired, the total amount supplied will generally be on the order of at least about two mols per mol of $H_2S$. Ratios of from about 2 mols to about 15 mols of solubilized oxidant per mol of $H_2S$ may be used, with ratios of from about 2 mols per mol to about 5 mols of solubilized oxidant per mol of $H_2S$ being preferred. It has been found advantageous, in at least one instance, to maintain some quantity of the reduced form of the metal in the aqueous reactant solution. For example, in the case of iron, the molar ratio of the ferric chelate of the acid or acids to the ferrous chelate of the acid or acids present in the contacting solution will normally be less than about 6, and will preferably range from about 0.2 to about 6, most preferably about 0.5 to about 6. The oxidant solution will generally be supplied as an aqueous solution having a concentration of from about 0.1 molar to about 3 molar; a concentration of from about 0.5 to about 1.5 molar is preferred. The total metal concentration will range from about 0.01 percent, preferably about 0.5 percent, to about 7 percent by weight, based on the weight of the solution and the metal. As indicated, the solubilized some chelates of the acid or acids may be formed in aqueous solution by the reaction of elemental metal or of an appropriate salt, oxide, or hydroxide of the metal and the specified acid, in the presence of alkali metal or ammonium ions, or with the ammonium or alkali metal salt.

BRIEF DESCRIPTION OF THE DRAWING

In order to describe the invention in greater detail, reference is made to the accompanying schematic drawing.

Figure 1:
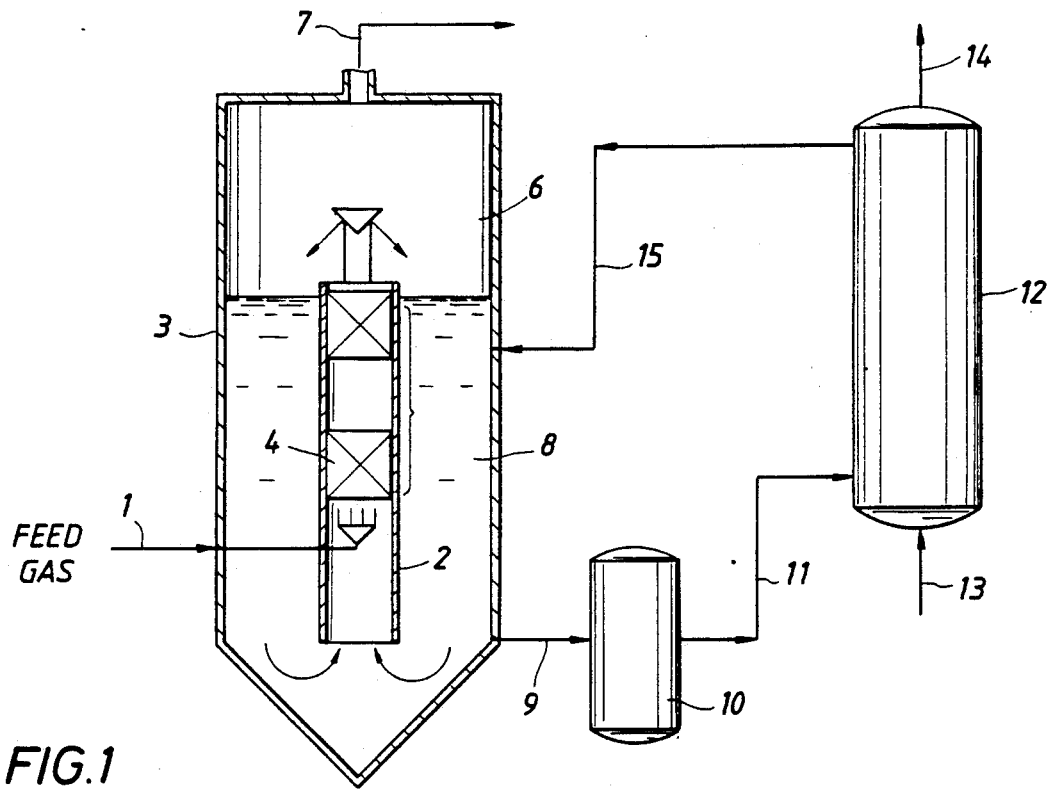
FIG. 1 illustrates an embodiment of the invention wherein the reaction zone is internal to the system, sulfur removal is accomplished in a separate step before regeneration, and regenerated solution is returned to the contacting zone for use as the contacting solution.

As shown, sour gas, e.g., a natural gas stream containing about 0.5 percent $H_2S$, in line (1) flows into generally cylindrical open column (2) positioned in vessel (3) wherein it is intimately contacted in zone (4) thereof with aqueous reactant solution which comprises aqueous 0.35M solution of ammonium ferric nitrilotriacetate chelate, which mixture also contains 0.15 moles per liter of ammonium ferrous nitrilotriacetate chelate and about 0.25 mole per liter of ammonium thiosulfate, pH of the solution being adjusted to 7.5 to 8 by the addition of ammonium hydroxide. The solution is produced by utilization of the reducing effect of the $H_2S$ in the gaseous stream. That is, the initial solution employed in the contacting zone (4) illustrated in a 0.35M aqueous solution of ferric nitrilotriacetate also containing about 1.0M ammonium ion. After startup, and reaction with $H_2S$ in the gaseous stream, regeneration, described hereinafter, is controlled, so that regeneration of the ammonium ferric nitrilotriacetic acid complex is not complete.

In zone (4), the gas stream containing $H_2S$ and the aqueous reactant mixture are intimately mixed to form a gas-reactant liquid mixture, sulfur almost immediately forming, and the gas-reactant liquid mixture is passed upward in cocurrent flow. Although a spray nozzle is illustrated, other suitable devices or techniques which provide intimate mixing or contacting of the gas and aqueous reactant mixture may be employed. In the event, contacting section (4) also comprises a plurality of chevron type flow directing elements (5) which provides a plurality of discrete channels for the passage and direction of the gas-reactant liquid mixture at a 30° angle to the direction of flow to the side of the cylindrical column. In this illustration, the element used is a Koch SMV ® mixing element. To insure that the surfaces of the channels are resistant to sulfur deposition, the mixing element (and all those described hereinafter for zone [4]) and the walls of zone (4) are electropolished before use. At least substantial plug flow overall through zone (4) is obtained. The superficial velocity of the gas is 20 ft/sec., and the liquid to gas volumetric flow ratio is 2:100. The width of the channels of each element is about 1 inch, and the diameter of the column is about 12 inches. The length of each element in the direction of flow is about 12 inches. As indicated, other types of elements may be employed. At the outlet of the column (2), gas-reactant liquid mixture enters an open section or separating zone (6) of a gas-liquid separation vessel (3) where the natural gas is separated from the liquid and sulfur. Purified natural gas is removed overhead via line (7), and "spent" reactant liquid and sulfur are collected in reservoir (8) of the vessel (3). As shown, reservoir (8) surrounds column (2) and communicates with the inlet of column (2) whereby liquid (aqueous reactant solution) is supplied to the column. The liquid need not fully surround column 2, but the height of the liquid with respect to column 2 must be sufficient to supply liquid to the inlet (and zone [4]) by head pressure.

As those skilled in the art will recognize, solution concentrations, sulfur content, and ferric-ferrous ligand concentrations and ratios must be regulated to achieve appropriate H₂S removal, as described, supra. To maintain appropriate ferric concentrations and provide sulfur removal, a stream (9) is sent for regeneration and sulfur removal.

More particularly, the aqueous admixture in line (9) is sent to a depressurization and degassing unit (not shown), which also serves as a sulfur concentration or thickening zone, and then to sulfur recovery zone (10). Sulfur recovery may be accomplished in any suitable fashion, such as by filtration. For example, sulfur may also be recovered by that method described in U.S. Pat. No. 4,664,902 entitled "Separation of Sulfur from Chelate Solutions", filed Aug. 23, 1985, incorporated herein by reference. As those skilled in the art will recognize, sulfur may be removed after regeneration, if desired. In any event, solution recovered during sulfur recovery may be returned to any suitable point in the process, if proper adjustment is made. Preferably, however, the solution recovered is sent to the regeneration zone, as shown, via line (11).

In regeneration zone or column (12), which may be a sparged tower, the admixture is contacted cocurrently with excess air in line (13) to convert ferrous chelate of nitrilotriacetic acid to ferric chelate of nitrilotriacetic acid. Air velocity in the regenerator is in the range of 0.1 to 0.3 feet per second, the temperature of the liquid is about 45° C., and overall pressure is about 2 atmospheres. Spent air is removed via line (14), and regenerated admixture, having a ratio of ferric chelate of nitrilotriacetic acid to ferrous chelate of nitrilotriacetic acid of about 2.5, is returned via line (15) to reservoir (8) which provides reactant solution by static pressure to column (2).

Figure 2:
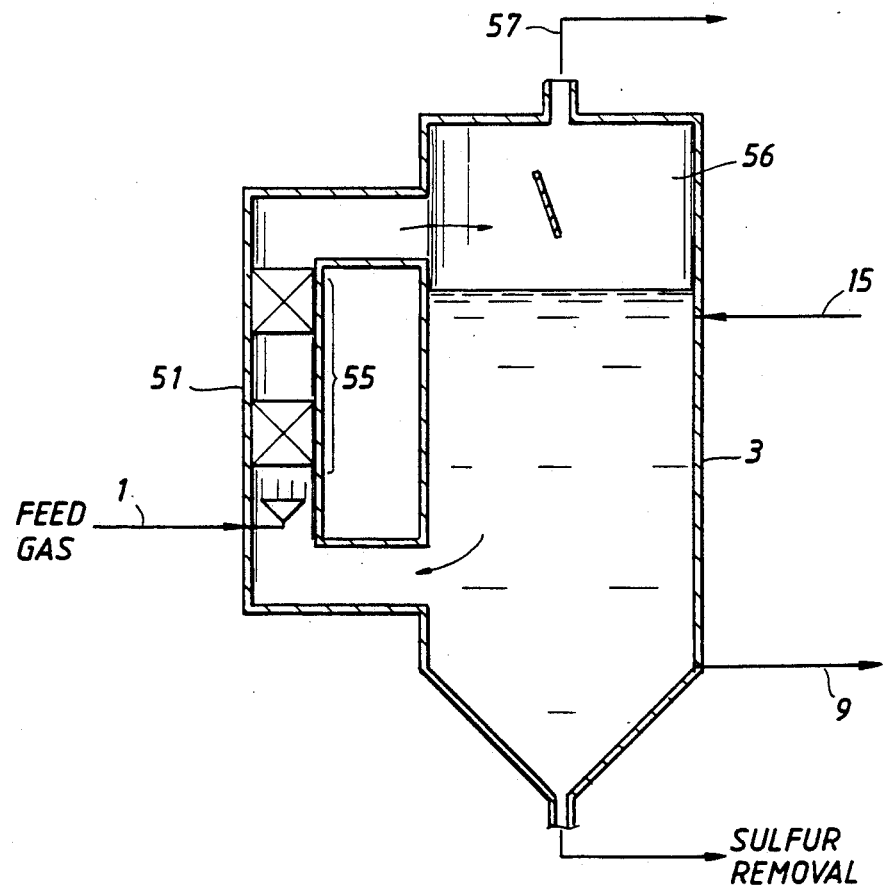
FIG. 2 illustrates an embodiment wherein the reaction zone is external to the system. All values are calculated or merely exemplary, and all flows, unless stated otherwise, are continuous.

In FIG. 2, the natural gas feed in line (1) is supplied to an external column (51) having elements (55). Column (51) connects to vessel (3) as shown. The gas reactant solution mixture flows into open space (56), with the purified gas being removed via line (57). Operation is otherwise similar to that of the system of FIG. 1, liquid from the reservoir being supplied by hydrostatic pressure to the inlet of column (51).

As will be understood by those skilled in the art, the solutions or mixtures employed may contain other materials or additives for given purposes. For example, U.S. Pat. No. 3,933,993 discloses the use of buffering agents, such as phosphate and carbonate buffers. Similarly, U.S. Pat. No. 4,009,251 describes various additives, such as sodium oxalate, sodium formate, sodium thiosulfate, and sodium acetate, which are beneficial, and other additives, such as additives to improve sulfur separation, or antifoaming and/or wetting agents, may be employed. Finally, it is not necessary that sulfur be removed from the stream sent for regeneration; the sulfur may be allowed to collect in the bottom of the gas-liquid separation vessel, from which it may be removed periodically, or a separate bleed may be provided.

What is claimed is:

1. A process for the removal of hydrogen sulfide from a sour gaseous stream comprising feeding the sour gaseous stream to a vertically disposed walled reaction zone containing an aqueous reactant solution, at a temperature below the melting point of sulfur, the aqueous reactant solution containing an amount of solubilized oxidizing agent sufficient to reduce the concentration of H₂S in said stream;

passing said gaseous stream and aqueous reactant solution concurrently upward through the reaction zone, the momentum of the gaseous stream being sufficient to provide and providing the principal motive force for the upward movement of the aqueous reactant solution, under conditions and for a time sufficient to remove hydrogen sulfide from said gaseous stream, and producing a purified gas, sulfur, and partially spent solution admixture;

passing the purified gas, sulfur, and partially spent solution admixture to a gas-liquid separation zone comprising an open separation space and a liquid reservoir in liquid flow communication with the entrance of said reaction zone, separating the purified gas, sulfur, and partially spent solution admixture in said separation zone into a purified gas stream and partially spent solution containing sulfur; and collecting and combining partially spent solution containing sulfur with and forming a part of the aqueous reactant solution in said reservoir;

removing aqueous reactant solution from the reservoir, and regenerating at least a portion thereof to produce a regenerated reactant solution, and returning regenerated reactant solution to the liquid reservoir and combining the regenerated reactant solution with the aqueous reactant solution;

periodically or continuously recovering sulfur from aqueous reactant solution or regenerated reactant solution;

concurrently maintaining the aqueous reactant solution liquid level is said reservoir at a level sufficient to provide aqueous reactant solution by gravity to the entrance of said reaction zone.

2. The process of claim 1 wherein the oxidizing agent employed in the aqueous reactant solution is a polyvalent metal supplied in ionic form or as a chelate.

3. The process of claim 2 wherein the polyvalent metal is iron and is supplied as a chelate.

4. The process of claim 3 wherein the chelate is that of an acid having the formula

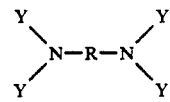

wherein
from two to four of the groups Y are selected from acetic and propionic acid groups;
from zero to two of the groups Y are selected from 2-hydroxyethyl, 2-hydroxypropyl, and

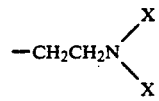

wherein X is selected from acetic and propionic acid groups; and R is ethylene, propylene or isopropylene or alternatively cyclohexane or benzene where the two hydrogen atoms replaced by nitrogen are in the 1,2 position, or is that of nitrilotriacetic acid, and mixtures thereof.

5. The process of claim 1 wherein the inlet for liquid to the walled reaction zone is positioned in the reservoir and is surrounded by the liquid.

6. The process of claim 1 wherein the inlet for liquid to the walled reaction zone is external to the reservoir.

7. The process of claim 5 wherein the aqueous reactant solution contains the ferric chelate of nitrilotriacetic acid in an amount sufficient to reduce the concentration of $H_2S$ in the sour gaseous stream and produce a purified gas.

8. The process of claim 5 wherein the aqueous reactant solution contains the ferric chelate of N-(2-hydroxyethyl) ethylenediamine triacetic acid in an amount sufficient to reduce the concentration of $H_2S$ in the sour gaseous stream and produce a purified gas.

9. The process of claim 6 wherein the aqueous reactant solution contains the ferric chelate of nitrilotriacetic acid in an amount sufficient to reduce the concentration of $H_2S$ in the sour gaseous stream and produce a purified gas.

10. The process of claim 6 wherein the aqueous reactant solution contains the ferric chelate of N-(2-hydroxyethyl) ethylenediamine triacetic acid in an amount sufficient to reduce the concentration of $H_2S$ in the sour gaseous stream and produce a purified gas.

* * * * *